United States Patent [19]

Plichta et al.

[11] Patent Number: 4,751,160
[45] Date of Patent: Jun. 14, 1988

[54] ORGANIC ELECTROLYTE FOR USE IN A LITHIUM RECHARGEABLE ELECTROCHEMICAL CELL AND LITHIUM RECHARGEABLE ELECTROCHEMICAL CELL INCLUDING SAID ORGANIC ELECTROLYTE

[75] Inventors: Edward J. Plichta, Freehold; Steven M. Slane, Neptune; Mark Salomon, Fairhaven, all of N.J.

[73] Assignee: The United States of America as represented by the Secretary of the Army, Washington, D.C.

[21] Appl. No.: 70,753

[22] Filed: Jul. 6, 1987

[51] Int. Cl.$^4$ ............................................. H01M 10/40
[52] U.S. Cl. ..................................... 429/197; 429/218
[58] Field of Search ........................ 429/194, 197, 218

[56] References Cited

U.S. PATENT DOCUMENTS

| | | | |
|---|---|---|---|
| 3,681,144 | 8/1972 | Dey et al. | 429/197 |
| 3,829,330 | 8/1969 | Dey | 429/194 |
| 3,945,848 | 3/1976 | Dey et al. | 429/198 |
| 4,113,929 | 9/1978 | Margalit | 429/194 |
| 4,223,079 | 9/1980 | Margalit et al. | 429/194 |
| 4,229,509 | 10/1980 | Margalit | 429/194 |
| 4,252,876 | 2/1981 | Koch | 429/197 |
| 4,302,518 | 11/1981 | Goodenough et al. | 429/194 |

Primary Examiner—Donald L. Walton
Attorney, Agent, or Firm—Sheldon Kanars; Roy E. Gordon

[57] ABSTRACT

1 to 2 mol dm$^{-3}$ LiAsF$_6$ in dimethylcarbonate or 1 to 2 mol dm$^{-3}$ LiAsF$_6$ in dimethylcarbonate mixtures with methyl formate in which the mass percent of the dimethylcarbonate compound can vary from 25 mass percent to 100 mass percent is used as the electrolyte in a lithium rechargeable electrochemical cell.

The cell also includes lithium as the anode and a lithium intercalating compound as the cathode.

1 Claim, 2 Drawing Sheets

ORGANIC ELECTROLYTE FOR USE IN A LITHIUM RECHARGEABLE ELECTROCHEMICAL CELL AND LITHIUM RECHARGEABLE ELECTROCHEMICAL CELL INCLUDING SAID ORGANIC ELECTROLYTE

The invention described herein may be manufactured, used, and licensed by or for the Government for governmental purposes without the payment to us of any royalty thereon.

This invention relates in general to the use of an organic electrolyte in a lithium rechargeable electrochemical cell and to a lithium rechargeable electrochemical cell including said electrolyte; and in particular, to the use of 1 to 2 mol dm$^{-3}$ LiAsF$_6$ in dimethylcarbonate (DMC) or 1 to 2 mol dm$^{-3}$ LiAsF$_6$ in (DMC) mixtures with methyl formate (MF) in which the mass percent of the (DMC) can vary from 25 mass percent to 100 mass percent as the electrolyte in a lithium rechargeable electrochemical cell, and to a lithium rechargeable electrochemical cell including said electrolyte.

BACKGROUND OF THE INVENTION

Previous studies with Li$_x$CoO$_2$ ($0 < X < 1$) cathodes in a lithium rechargeable electrochemical cell have demonstrated the practicality of such a cathode. The initial studies found that the layered rock salt structure of Li$_x$CoO$_2$ could intercalate one mole of lithium per mole of cobalt at voltages of 4 V or greater, and theoretically was capable of providing energy densities in excess of 1000 Wh/kg. However, it was found that the cell could not be fully charged due to electrolyte decomposition at the higher charging potentials of greater than 4 V. Due to this limitation in charging, the practical configuration of the Li/Li$_x$Co$_2$ cell was limited to only half of the theoretical energy density. For example, the most promising Li/Li$_x$CoO$_2$ rechargeable cell used an electrolyte of LiAsF$_6$ in methylacetate (MA), and cycling between 2.5 V and 4.3 V resulted in energy densities from 400 to 500 Wh/kg over 20 cycles. These results were obtained at 25° C. and discharge and charge rates of 1.0 mA/cm$^2$ and 0.5 mA/cm$^2$ respectively.

SUMMARY OF THE INVENTION

The general object of this invention is to provide an improved electrolyte for use in a lithium rechargeable electro-chemical cell. A more particular object of the invention is to provide such an electrolyte that has a better oxidation stability at higher potentials than previous electrolytes. A still further object of the invention is to provide such an electrolyte that will have increased solvent stability with both the Li anode and Li$_x$CoO$_2$ cathode over a wide voltage range of $-1.0$ V to $+5.0$ V vs Li.

It has now been found that the aforementioned objects can be attained and a significant improvement in both cell cycle life and energy density attained by using an improved electrolyte based on the solvent (DMC) and (DMC) mixtures with (MF). More particularly, it has been found that an electrolyte of 1 to 2 mol dm$^{-3}$ LiAsF$_6$ in (DMC) or 1 to 2 mol dm$^{-3}$ LiAsF$_6$ in (DMC) mixtures with (MF) in which the mass percent of the (DMC) component can vary from 25 mass percent to 100 mass percent in a Li/Li$_x$CoO$_2$ cell shows significantly improved oxidation resistance to 5.0 V vs Li, delivers higher energy density than obtainable with previous electrolytes, shows significantly improved cell cycle life and greatly improved lithium plating efficiency.

Although pure (DMC) and (DMC)/(MF) mixtures perform quite well in Li/Li$_x$CoO$_2$ cells at room temperature, the high freezing point of dimethylcarbonate of about 0.5° C. precludes the use of this pure solvent in cells required to operate at very low temperatures. For very low temperatures, electrolyte solutions utilizing (DMC)/(MF) mixtures are required.

Although the Li/Li$_x$CoO$_2$ performs well in LiAsF$_6$/MA solutions for only about 10 to 20 cycles, the cell cannot be charged above 4.3 V vs Li if 10 to 20 charge/discharge cycles are to be realized. The reason is that above 4.3 V, the electrolyte is electrochemically oxidized at the cathode which results in significant reduction of cycle life. Cycling the Li/LiAsF$_6$–MA/ Li$_x$CoO$_2$ cell between 4.3 V and 2.5 V yields energy densities of between 500 to 400 Wh/kg. To increase the energy density of the Li/Li$_x$CoO$_2$ cell, it is necessary to charge the cathode to voltages greater than 4.3 V, and in which case a solvent is required which will not oxidize at these high potentials.

1.3 to 2.0 mol dm$^{-3}$ LiAsF$_6$ solutions in (DMC) and (DMC)/(MF) mixtures have much greater resistance to oxidation at high potentials than other systems.

DESCRIPTION OF THE DRAWING

Referring to FIG. 1, this figure shows the improved stability or resistance to oxidation of LiAsF$_6$ in DMC and DMC/MF mixtures compared to pure MF solutions. The voltammograms shown in FIG. 1 reveal that DMC and DMC/MF solutions exhibit much greater stability up to about 5.0 V vs Li.

Referring to FIGS. 2, 3, and 4, these figures demonstrate the improved energy density obtained with cycling using the DMC and DMC/MF electrolytes over the MA-based system. No significant losses in capacity are observed over these conditions suggesting excellent electrochemical stabilities of the system between the potential range of 4.75 V to 2.5 V. With the more stable DMC, DMC/MF electrolytes, improvements of 15 to 30 percent are obtained in the energy density of the Li/Li$_x$CoO$_2$ cell, with greater than 60 percent cathode utilization over 20 cycles. No visible degradation of any component is observed, and atomic absorption analysis for cobalt solubilities are favorable, with only trace amounts of cobalt of less than 10 ppm being found in solutions.

Figure 1:
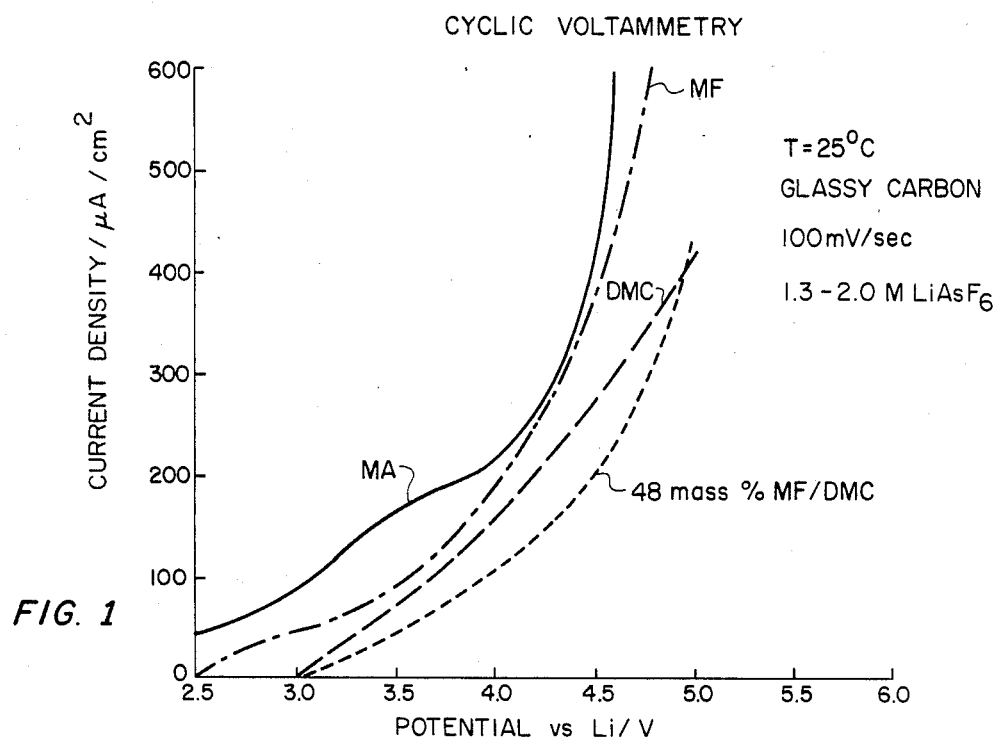
FIG. 1 is a graph of cylic voltammetry of LiAsF$_6$ electrolytes at a glassy carbon electrode versus a lithium reference at 25° C.
Figure 2:
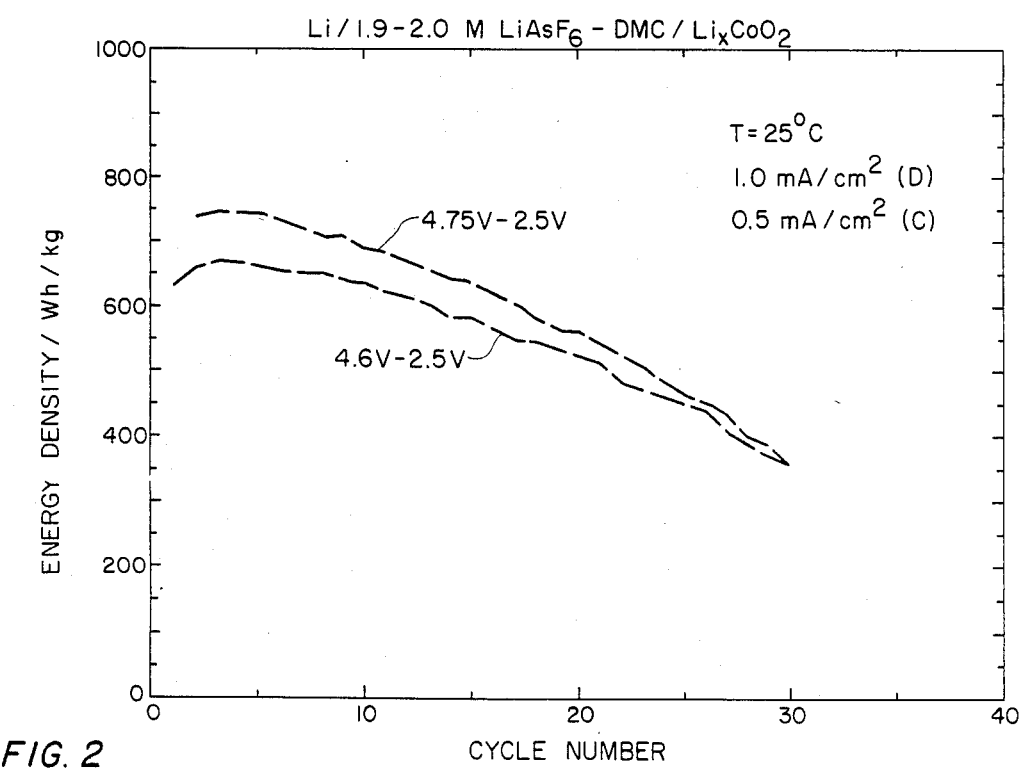
FIG. 2 is a graph of energy density as a function of discharge cycle number at 25° C.
Figure 3:
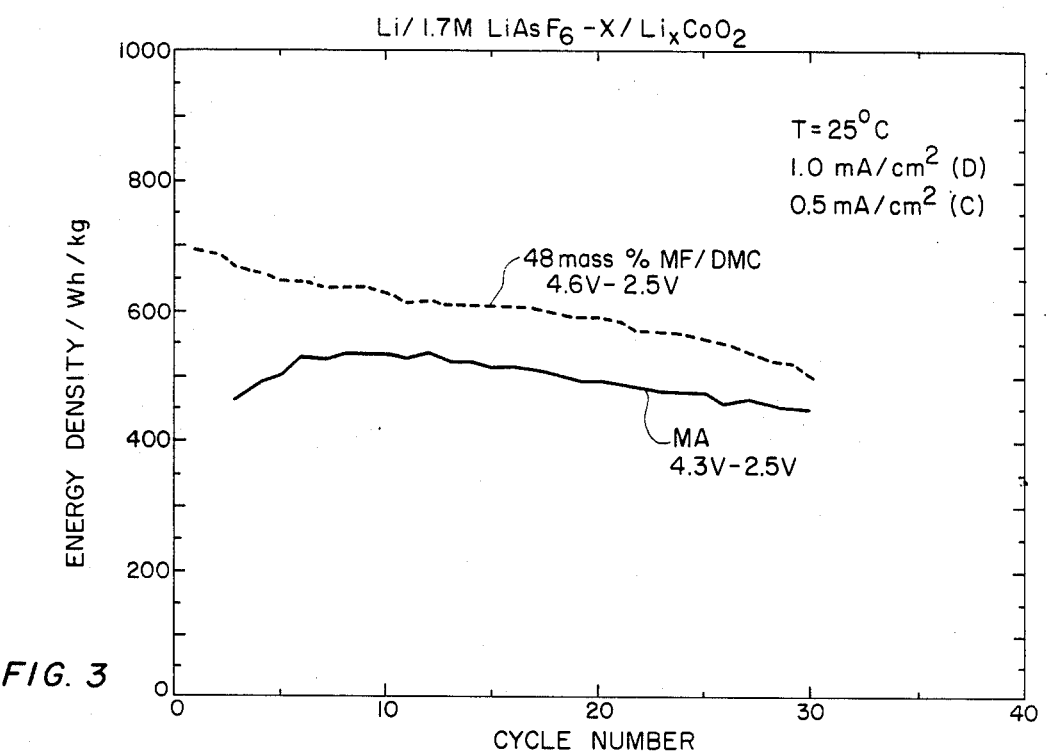
FIG. 3 is a graph of energy density as a function of discharge cycle number at 25° C.
Figure 4:
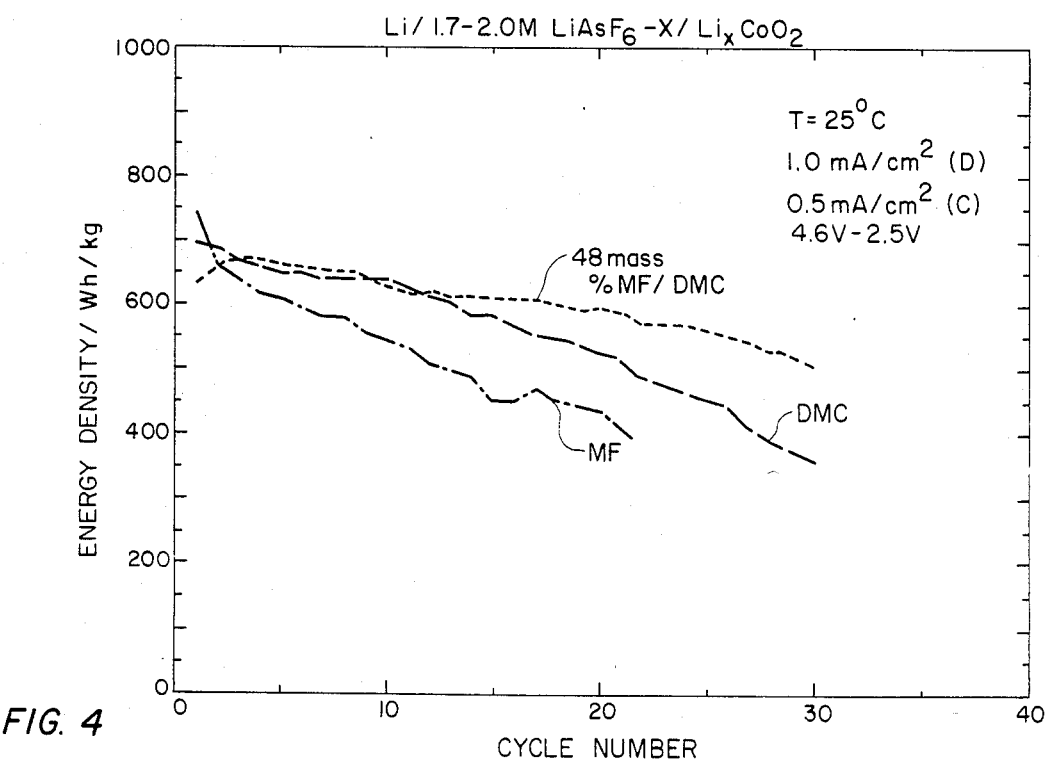
FIG. 4 is a graph of energy density as a function of discharge cycle number at 25° C.

These results far exceed those reported for Li/Li$_x$CoO$_2$ in other electrolytes and demonstrate the superior performance of the DMC, DMC solvent mixtures with LiAsF$_6$.

Another important feature of LiAsF$_6$ solutions in DMC and DMC/MF mixtures is the greatly improved lithium cycling efficiency which is determined is two types of experiments. In the first type of experiment, the efficiency of lithium plating and stripping is determined in platinum (Pt) substrate. In this experiment, lithium is continually plated and stripped using a Pt substrate and a 1.0 mol dm$^{-3}$ LiAsF$_6$ solution in DMC at 25° C. Plating 0.5 C/cm$^2$, lithium is plated and stripped at a current density of 1 mA/cm$^2$ for 300 cycles at an average cycle efficiency of 96%. This efficiency far exceeds those obtained for other electrolyte solutions which rarely exceed 90%, and are typically 80% or lower.

A second experiment involves plating and stripping lithium using solid lithium as the substrate. A total plating capacity of 10 C/cm$^2$ is used with plating and stripping currents of 1.0 mA/cm$^2$. Again, improved lithium cycling efficiency is observed: e.q. using 1.9 mol dm$^{-3}$ LiAsF$_6$ in DMC and 1.6 mol dm$^{-3}$ LiAsF$_6$ in a DMC/MF mixture containing 48 mass percent MF, plating and stripping for 50 cycles results in average cycle efficiencies of 80 to 82 percent.

We wish it to be understood that we do not desire to be limited to the exact details as described for obvious modifications will occur to a person skilled in the art.

What is claimed is:

1. A lithium rechargeable electrochemical cell comprising lithium as the anode, the lithium intercalating compound Li$_x$CoO$_2$ $(0 < X < 1)$ as the cathode, and an electrolyte of 1 to 2 mol dm$^{-3}$ LiAsF$_6$ in dimethylcarbonate mixtures with methyl formate in which the mass percent of the dimethylcarbonate component can vary from 25 mass percent to 100 percent.

* * * * *